Jan. 10, 1967   C. D. MOEKLE   3,296,657
METHOD FOR MAKING LINKED PRODUCTS
Original Filed Dec. 24, 1963   17 Sheets-Sheet 4

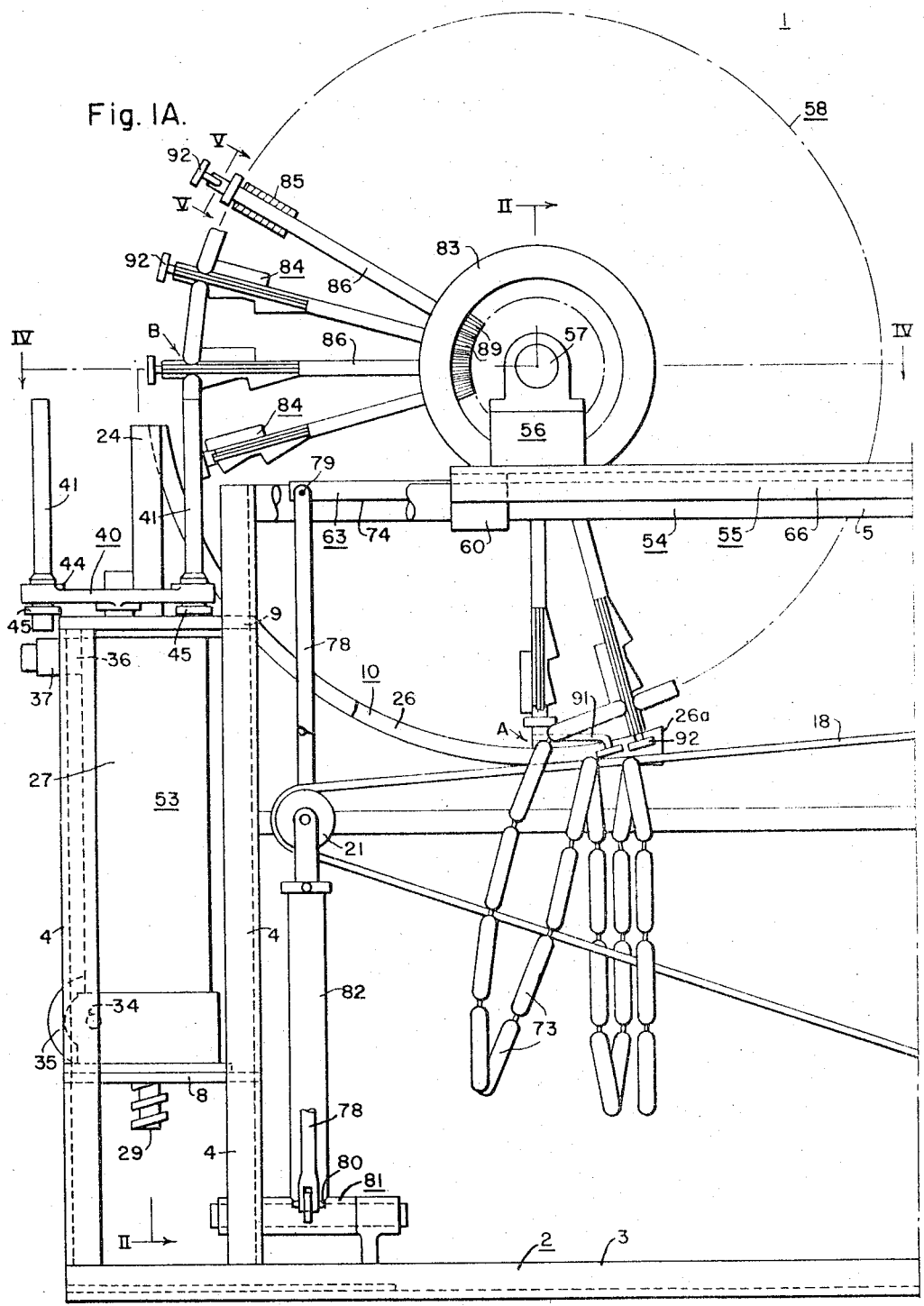

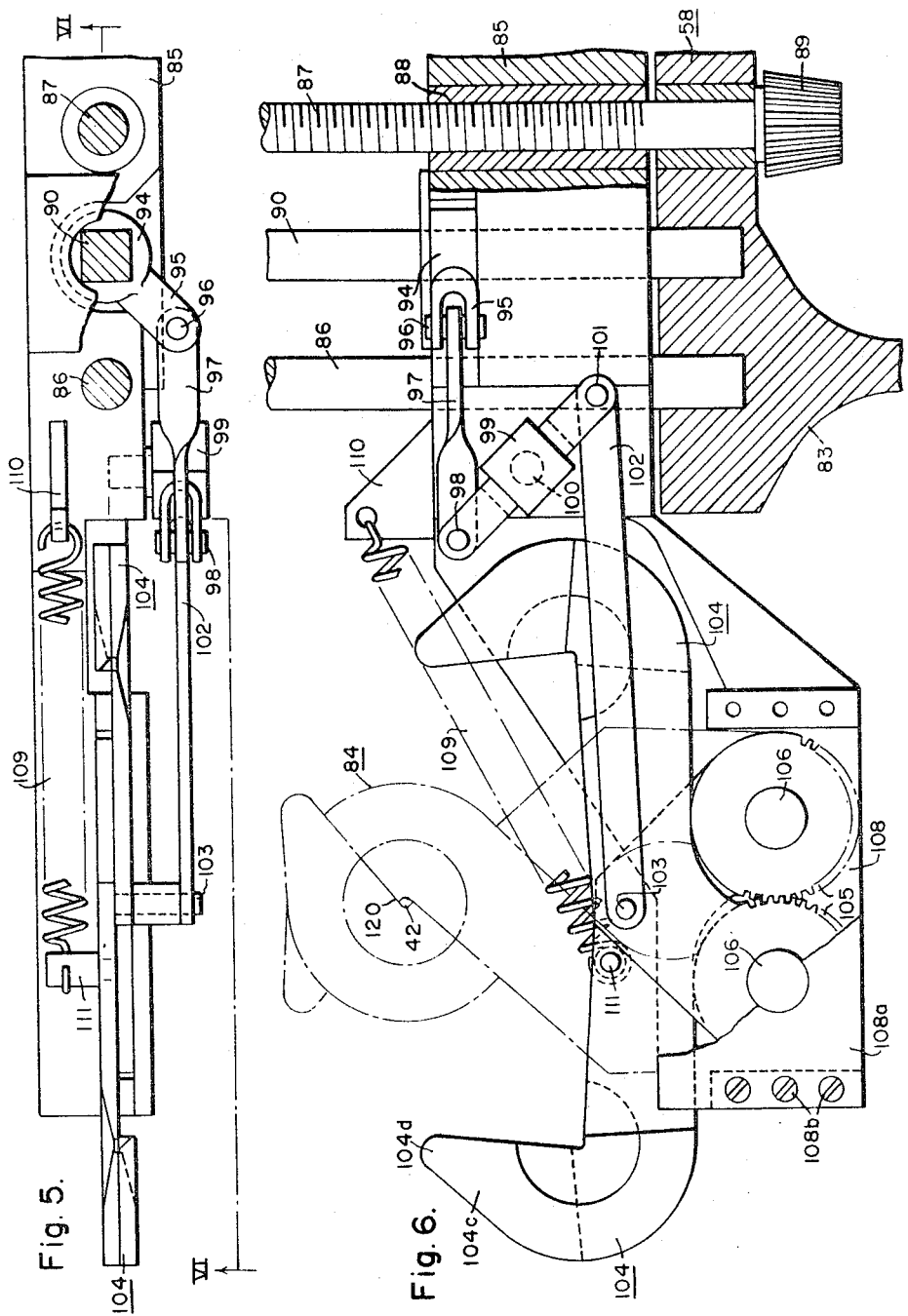

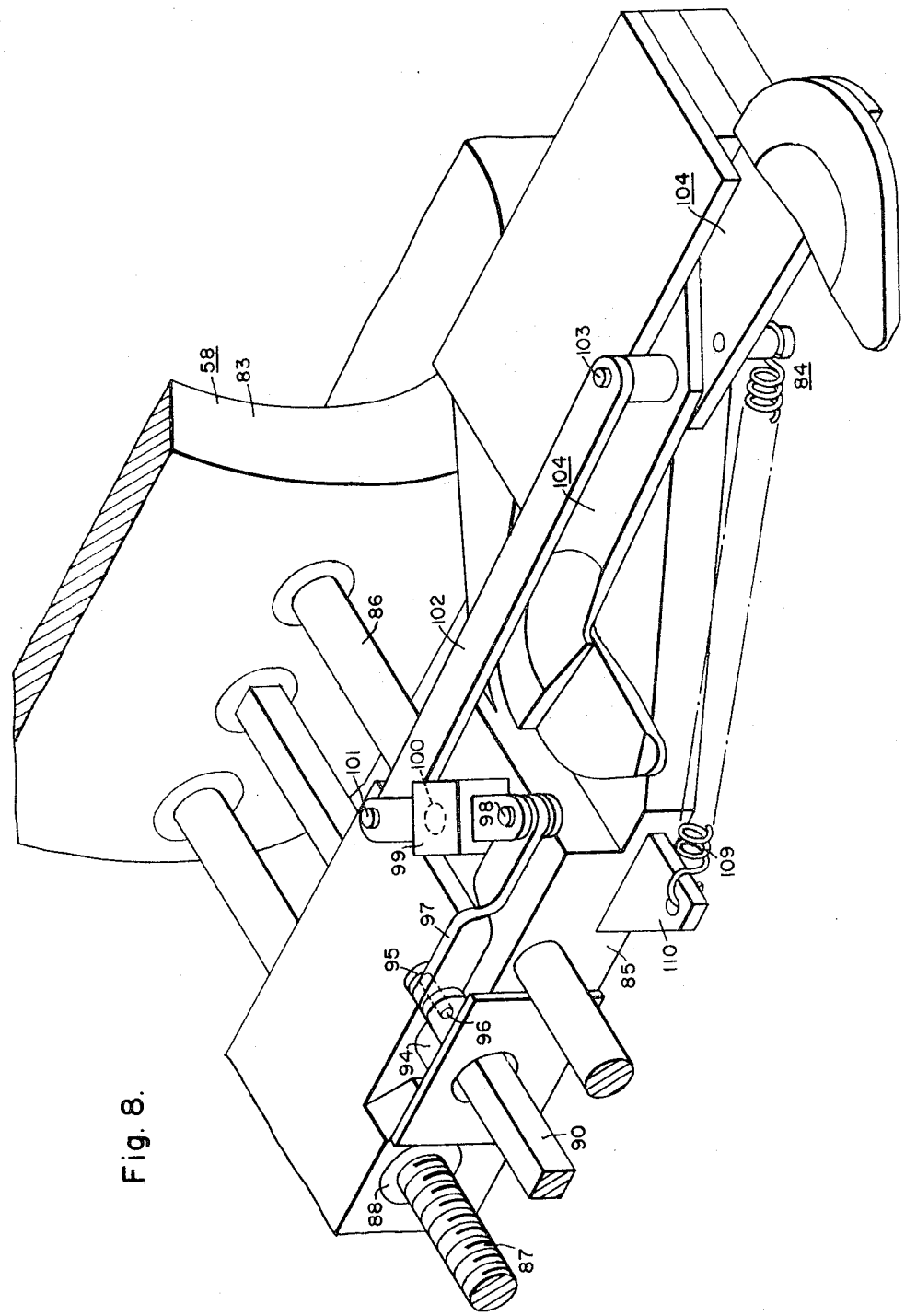

Jan. 10, 1967   C. D. MOEKLE   3,296,657
METHOD FOR MAKING LINKED PRODUCTS
Original Filed Dec. 24, 1963   17 Sheets-Sheet 9
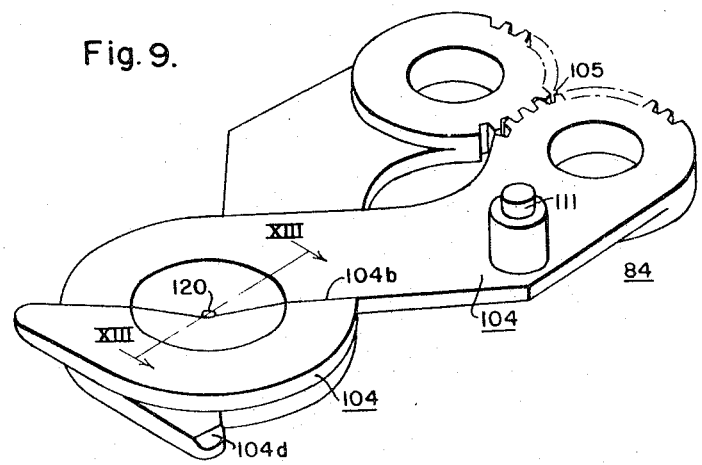
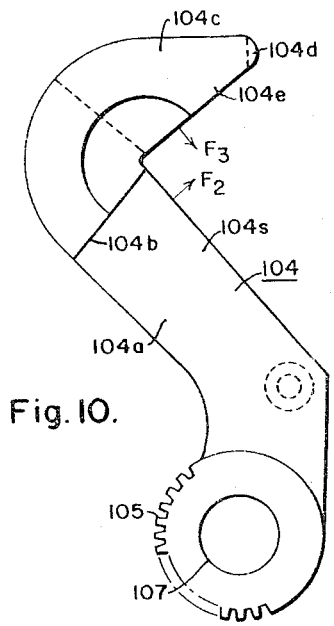
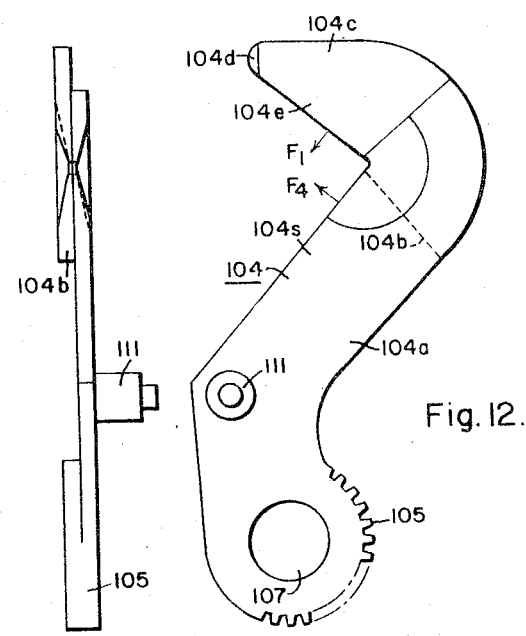

Jan. 10, 1967  C. D. MOEKLE  3,296,657
METHOD FOR MAKING LINKED PRODUCTS
Original Filed Dec. 24, 1963  17 Sheets-Sheet 10

Jan. 10, 1967  C. D. MOEKLE  3,296,657
METHOD FOR MAKING LINKED PRODUCTS
Original Filed Dec. 24, 1963  17 Sheets-Sheet 11
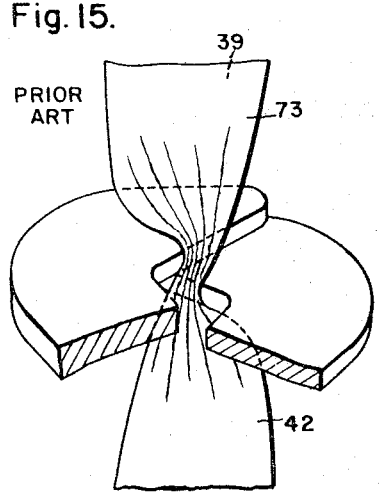
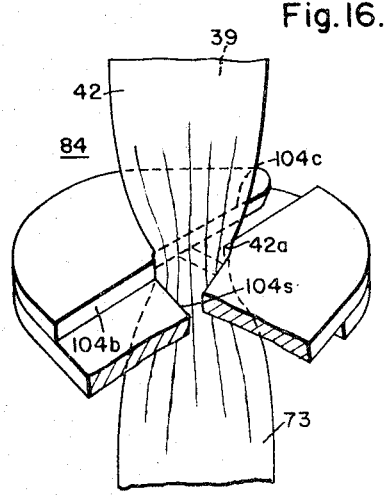
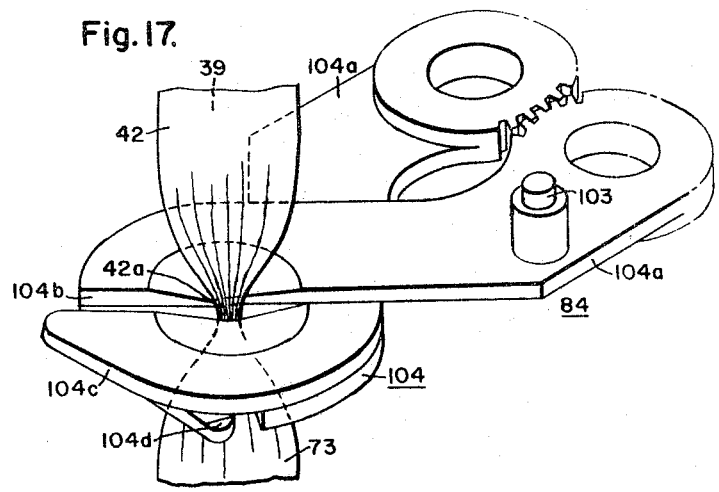

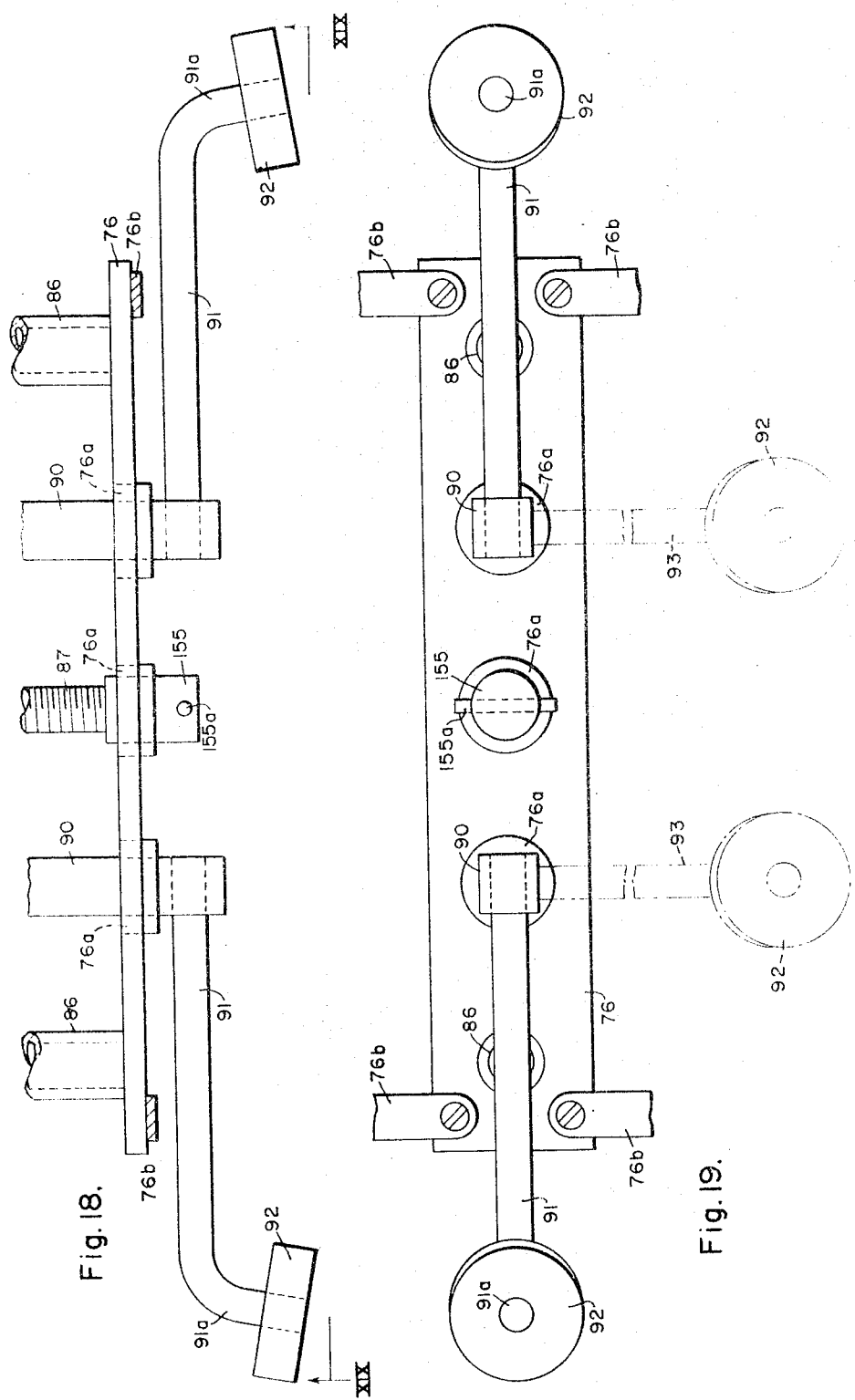

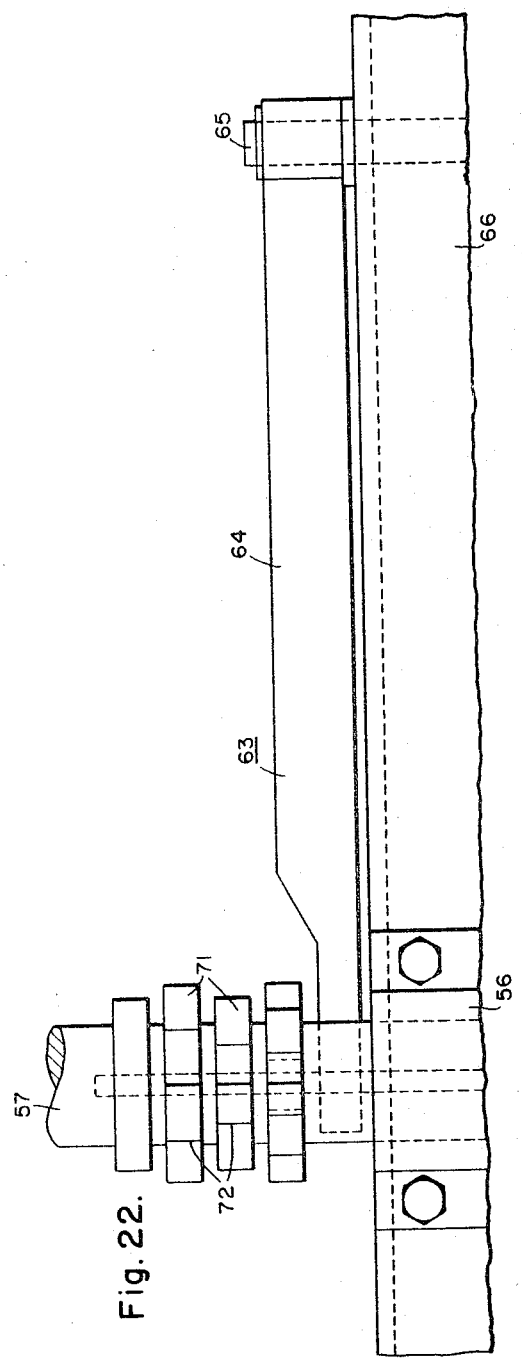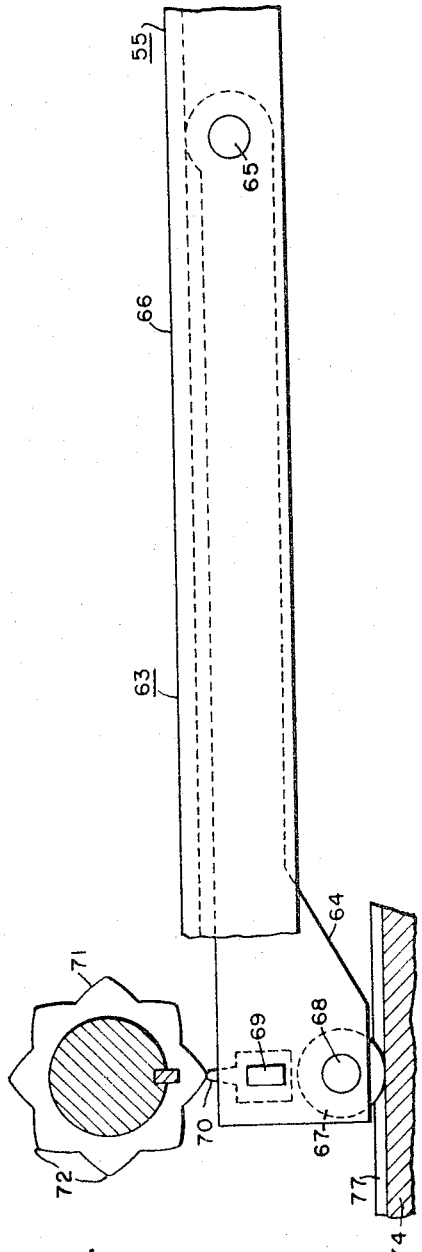

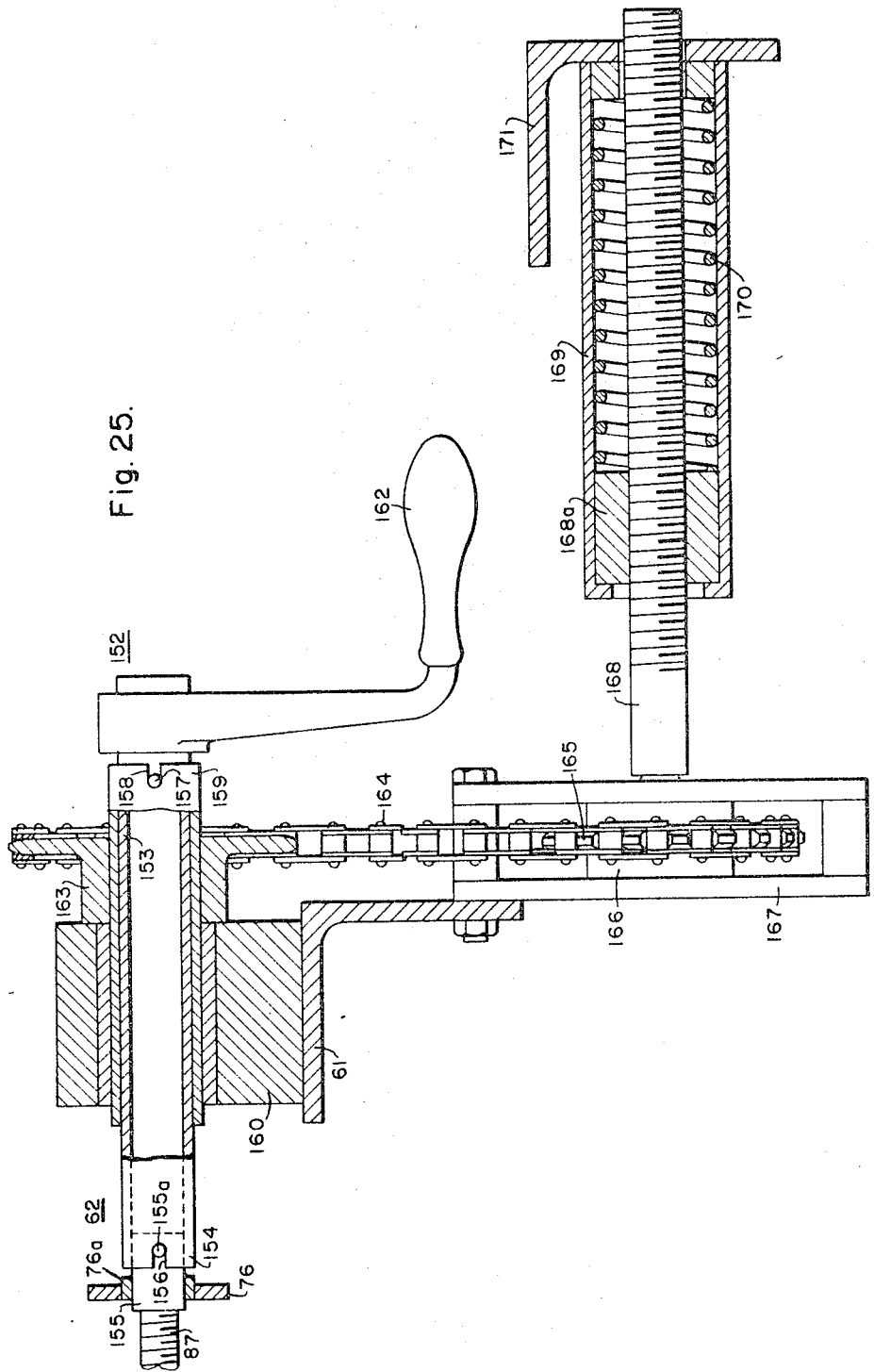

Jan. 10, 1967   C. D. MOEKLE   3,296,657
METHOD FOR MAKING LINKED PRODUCTS
Original Filed Dec. 24, 1963   17 Sheets-Sheet 16

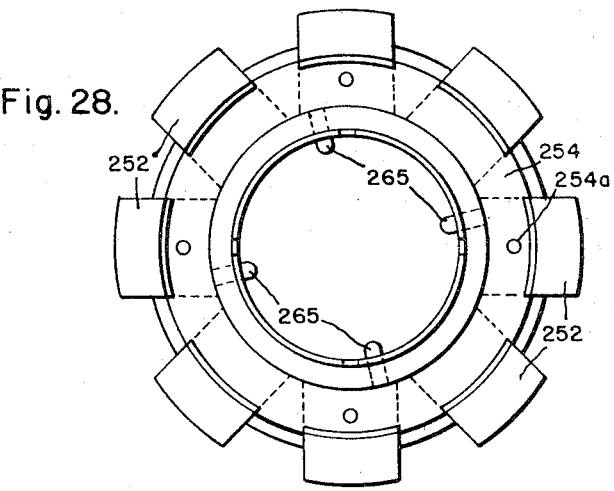
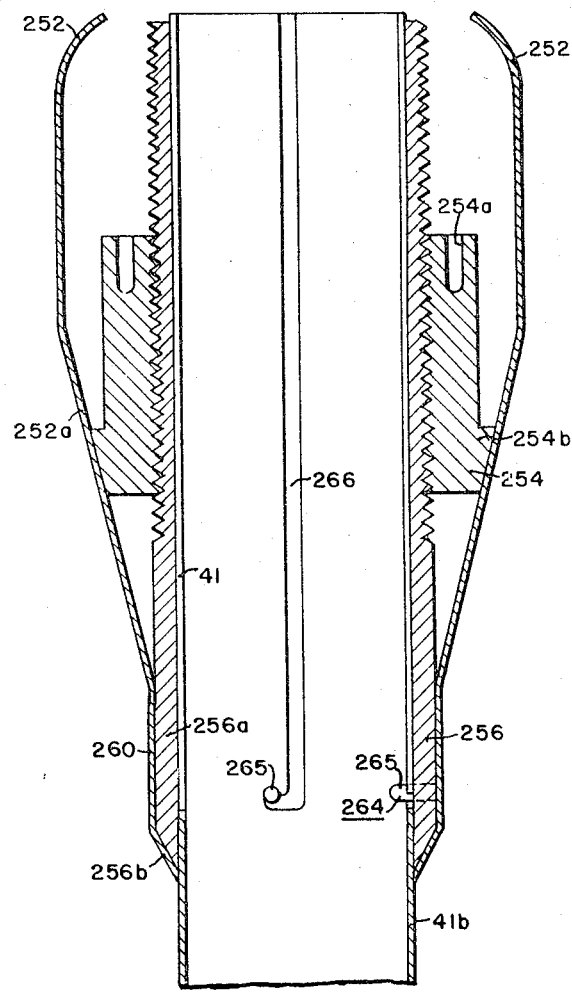

United States Patent Office 3,296,657
Patented Jan. 10, 1967

3,296,657
METHOD FOR MAKING LINKED PRODUCTS
Charles D. Moekle, Penn Hills Township, Allegheny County, Pa. (10063 Grandview Ave., Pittsburgh, Pa. 15235)
Original application Dec. 24, 1963, Ser. No. 333,148, now Patent No. 3,264,679, dated Aug. 9, 1966. Divided and this application Oct. 19, 1965, Ser. No. 497,796
13 Claims. (Cl. 17—45)

This application is a division of the application filed December 24, 1963, Serial No. 333,148, now Patent No. 3,264,679, issued August 9, 1966.

This invention relates to an improved method for making linked products, such as sausages, frankfurters, and the like. More particularly, the invention relates to an improved and highly efficient method for quickly continuously linking a continuous length of stuffed casing.

The method of the present invention is capable of forming links of varying lengths and sizes, and, in addition, the invention is capable of being employed in connection with a sausage stuffing machine in which a continuous length of stuffed product is discharged therefrom. Moreover, the instant invention is also capable of being employed in connection with a stuffing apparatus in which a predetermined length of stuffed product is discharged therefrom periodically, for example, an apparatus comprising a stuffing horn over which is placed a predetermined length of shirred material, such as artificial casing. Reference may be made to U.S. Patents 2,984,574, 2,999,756 and 2,999,757 as descriptive of such casing material.

Further, the method of the present invention is particularly adapted to be employed with a stuffing apparatus, and it is adapted to be operated simultaneously and uniformly therewith to divide the continuous length of stuffed casing into uniform links.

While for the most part, for purposes of simplicity of description, reference will be made to the preparation of linked sausage, it is to be clearly understood that the invention is not limited to such stuffed products, but is equally advantageous for the continuous production of encased stuffed products of plastic material, such as fats, scrapple, ice cream, meat products, as well as cheese, lard, olemargarine, grease, snuff, caulking compound, and other products normally stuffed into casings, and in the specification and claims, the expression "stuffed products" is intended to include all such products.

Heretofore numerous types of apparatus have been proposed for linking stuffed products. For example, means have been provided for carrying or feeding a filled sausage casing to a certain position relative to the dividing and twisting mechanism and then holding the same in a stationary position while the dividing and twisting mechanism performs its function of linking the sausage. This type of apparatus is disadvantageous in that an intermittent feeding and stopping movement of the filled sausage casing occurs during the operation of the machine to form the casing into links, and this continuous stopping of the filled sausage casing during its feeding movement and the resultant delay incurred while the linking mechanism performs its function greatly slows down the operation of linking the sausage to such a point that the same is but little, if any, better than the hand-linking method.

Numerous machines have been proposed for linking sausage continuously, that is, without any intermittent stopping of the feed mechanism to enable the linking mechanism to operate on the stuffed product. However, while some of these machines may have some peculiar or distinguishing advantages over and above other machines which perform the same function, there is considerable room for a great deal of improvement therein. The most important aspect to be attained in a continuous linking machine is increased production, that is, it is desirous to produce a compact and simply constructed device which is capable of linking stuffed products at a high rate of speed and at the same time, produce a linked product of high quality insofar as uniformity of size and compactness in the casing is concerned.

Most prior art devices are comprised of a multitude of intricate parts that are expensive to manufacture, difficult and costly to maintain, and from an engineering standpoint, have a relatively high wear factor. The mechanics of these devices are quite complicated compared to the relatively simple task of linking sausage products. Without exception, present linkers will produce only a limited range of products, necessitating numerous linkers to produce the many types of links and products currently made in sausage kitchens. The production rate of these machines is relatively slow when compared to the annual volume produced.

One of the biggest problems encountered by meat packers is the many sizes of links produced in the sausage kitchen. These links vary in length, diameter, type of casing used and type of meat grind used. There are no linkers available at present to successfully manufacture all of these products. No present linker has a volume output sufficiently high to produce the amount of links normally manufactured in average meat plants. With present equipment, certain operations must be skillfully and critically controlled by labor, or undue breakage of the product will result.

With most present devices the product must be stuffed manually, then linked automatically, and then hung on smoke sticks manually. My invention combines these three operations into one automated process. In many instances some products must be hand linked because present linkers will not adjust to the sizes required.

Most present linkers produce links of nonuniform size. Since most of these links are packaged on a "so many links per pound" basis, labor becomes an expensive factor in selecting links that in combination will equal the required weight.

Labor skill, which is always quite variable, must be used to vary the weight of the individual links to compensate for the nonuniformity of the product.

Accordingly, my invention substantially reduces the labor time required, from stuffing to packaging. It is the first all-encompassing linker engineered to produce links of all lengths, diameters, and meat grinds encountered in sausage kitchens. It automates sausage production by utilizing many advantages, made possible by the advances in modern technology. It has a high production rate which is a prime necessity to any device engineered to meet all requirements. This makes this device an all purpose linker which combines many of the sausage kitchen operations automatically.

Accordingly, it is a primary object of the present invention to provide a new and improved method for linking a continuous length of a stuffed product, the resultant links being of uniform size and length, and the operation being carried out continuously, quickly, and smoothly without interruption.

It is another object of the persent invention to provide a new and improved apparatus for producing linked sausage, frankfurters, and the like, which is compact, simple of construction, easily moved from one place to another for installation, and readily adaptable to be used with continuous sausage stuffers or stuffing apparatus.

Another very important object of the present invention is to provide a new and improved method of producing a linked stuffed product.

Further objects and advantages are within the scope of my invention, such as relate to the arrangement, operation and function of the related elements of the structure, to various details of construction and to combinations of parts, elements per se, and to economies of manufacture and numerous other features, as will be apparent from a consideration of the specification taken in conjunction with the several drawings disclosing a specific exemplary embodiment of my invention, in which:

FIGURES 1A and 1B collectively illustrate a side elevational view of a linking and twisting machine incorporating the principles of my invention, the view illustrating various operations being performed upon the stuffed product;

FIG. 5 is a fragmentary view, taken on an enlarged scale, of one of the clamping, pinching, or squeezing assemblies carried by the linking reel, the view being taken substantially along the line V—V of FIG. 1A;

FIG. 6 is a fragmentary side elevational view of the pincher assembly of FIG. 5 and also illustrating a radial sectional view through the hub of the linking reel as taken along the line VI—VI of FIG. 5;

FIG. 8 is a fragmentary perspective view, taken on an enlarged scale, of one of the pincher assemblies including the associated hub of the linking reel, and illustrating the open discharge position of the pincher arms;

FIG. 9 is a detail perspective view of a pair of cooperating pincher arms and showing the relation of the pincher arms in the completely closed constricting position thereof;

FIG. 10 is a detail plan view of one of the pincher arms;

FIG. 11 is an end elevational view of the pincher arm of FIG. 10;

FIG. 12 is a detail plan view of the pincher arm of FIG. 10, but illustrating the opposite face thereof;

FIG. 15 is a fragmentary perspective view showing the undesirable shearing action as effected by pincher arms of the prior art upon the product casing;

FIG. 16 is a fragmentary perspective view illustrating the oppositely-directed, balanced constricting forces exerted by the coacting pincher arms of the present invention upon the product casing, and showing such action at an intermediate point in the closing operation;

FIG. 17 is a detail perspective view of a pair of coacting pincher arms of the present invention in the substantially closed position and the link being formed thereby;

FIG. 18 is a fragmentary plan view of the end of the radially-positioned pincher assembly showing the cam-actuated pincher rods in the closed position;

FIG. 19 is an end view of the pincher assembly of FIG. 18 illustrating the closed portion of the pincher arms in full lines as taken along the line XIX—XIX of FIG. 18;

FIG. 22 is an enlarged fragmentary plan view of the cam mechanism for effecting oscillating movement of the product-accumulating cable carrier;

FIG. 23 is a fragmentary side view of the cam mechanism of FIG. 22;

FIG. 25 is an enlarged detailed side view, partially in vertical section, of the detachable coupling device for radially positioning the pincher-arm assemblies upon the linking reel, and for correcting the reel carriage position;

FIG. 27 is an enlarged view of a modified type casing holder having a variable means for creating internal friction upon the casing during discharge;

FIG. 28 is an end view of the modified-type casing holder of FIG. 27;

Figure 1B:
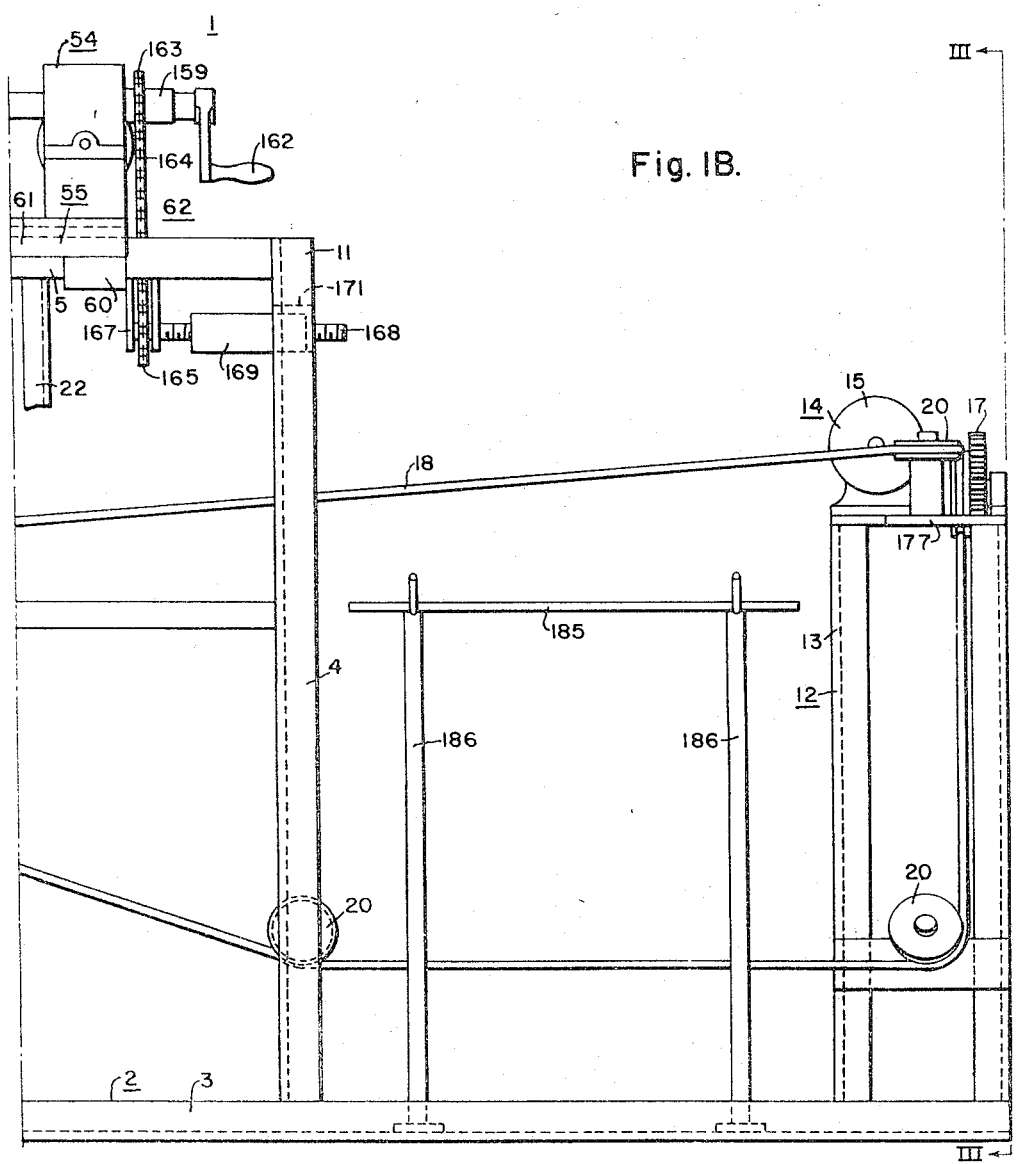
Figure 7:
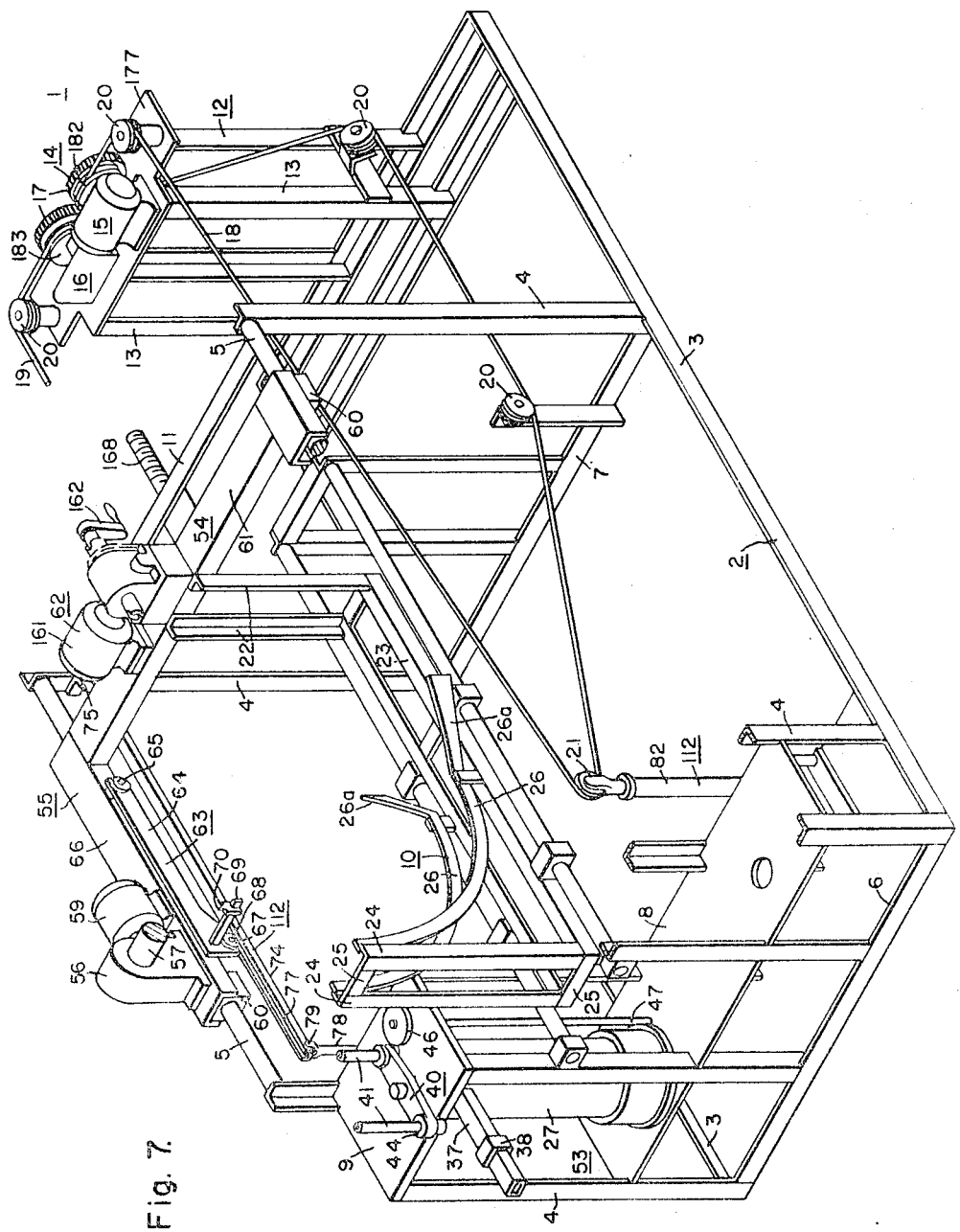
FIG. 7 is a perspective view of the stationary frame support, stuffing horn assembly, the slidable carrier for the linking reel (not shown) and a portion of the product-accumulating cable.

Referring to the drawings, and more particularly to FIGS. 1A and 1B thereof, the reference numeral 1 generally designates the improved machine of the present invention for making linked products. As shown, the linking machine 1 comprises a stationary support base, generally designated by the reference numeral 2, and having a pair of parallel-disposed longitudinally-extending angle-irons 3, a plurality of upright frame supports 4, upper bearing slide rails 5, and front and rear supporting members 6, 7. Reference is directed to FIG. 7 of the drawings in this connection.

In addition, the stationary supporting base 2 includes a lower support plate 8, an upper turret support plate 9, a stationary cam guide, generally designated by the reference numeral 10, and an upper rear supporting brace 11. Moreover, the stationary supporting base 2 comprises a rear base extension, generally designated by the reference numeral 12, and including upright support members 13 supporting, in turn, a conveyor cable driving mechanism 14. As shown, the conveyor cable driving mechanism 14 includes a drive motor 15, having an adjustable gear reduction device 16 associated therewith to vary the speed of driving wheels 17 for driving the two conveyor cables 18, 19. Suitably-positioned guide pulleys 20 are utilized, as shown in FIG. 7. One guide pulley 21, however, is oscillatable to provide a desired conveyor pattern for the linked products, as more fully described hereinafter.

Again with reference to FIG. 7, it will be observed that the cam guide, or device 10 includes downwardly depending support members 22, horizontally extending spaced cam supports 23, and upwardly extending cam guide supports 24. Suitable spacing supports 25 are, as shown, employed. The guide cam rails 26 are provided with a diverging entrance portion 26a, the purpose for which will appear more fully hereinafter.

Figure 2:
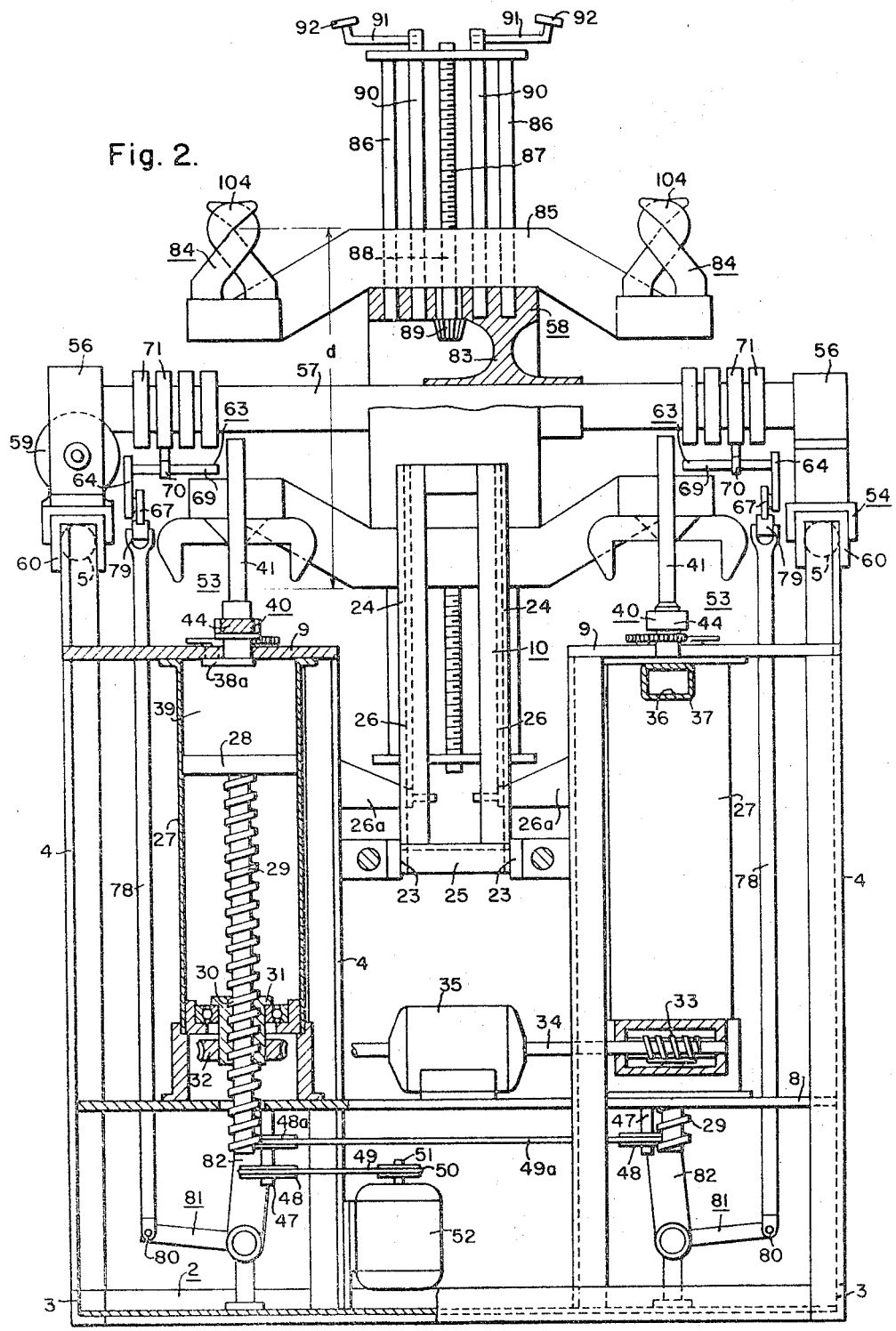
FIG. 2 is a front elevational view, partially in vertical section, of the inlet end of my improved machine, the view being taken substantially along the line II—II of FIG. 1A with the pincher assemblies moved inwardly to their innermost position for clarity.

Supported upon the support plate 8 is a pair of product-injecting cylinders 27, having reciprocally movable therewithin product-driving pistons 28. As shown in FIG. 2, each injecting piston 28 is secured to an externally threaded piston rod 29 threaded through the threaded aperture 30 of a lower rotatable drive head 31 having a driving worm gear 32 fixedly secured thereto. Each worm gear 32 of the respective product injecting cylinder 27 is driven by a worm 33 secured adjacent opposite ends of a drive shaft 34, the latter, in turn, being driven by an adjustable-speed, gear-reduced product-driving motor 35, also mounted upon the support plate 8.

Disposed adjacent the upper end of each product injecting cylinder 27 is a meat-inlet aperture 36 communicating with a product inlet pipe 37. Preferably, a control valve 38 is provided to periodically control the admission of the meat product, or emulsion 39 into the injecting cylinder 27 during the filling operation. A rotatable manually operated gate valve 38a is used to prevent the flow of product through the horn 41 during the filling of cylinder 27. The gate valve 38a is rotatable about pivot axis 38b and has a manually operable handle 38c associated therewith.

Figure 26:
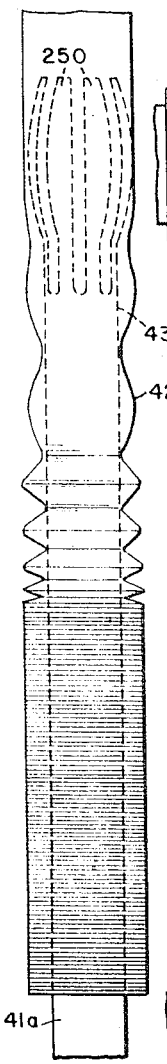
FIG. 26 is a fragmentary enlarged side elevational view of a stuffing horn, or casing holder, having internally frictionally-engaging fingers for creating the proper amount of drag upon the shirred casing.
Figure 29:
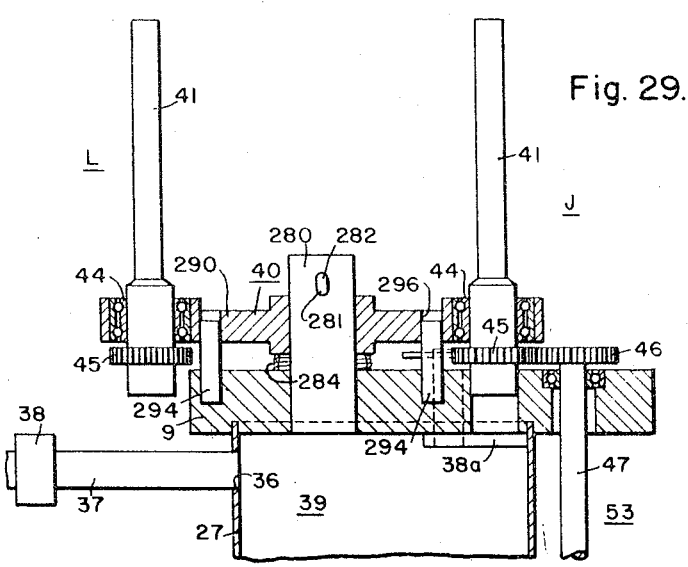
FIG. 29 is a fragmentary vertical sectional view taken through the multiple-unit turret assembly of FIG. 30 for accommodating a plurality of casing holders, the view being taken substantially along the line XXIX—XIX of FIG. 30.

Supported upon each of the two upper turret support plates 9 is a rotatable turret assembly, or head, generally designated by the reference numeral 40, and comprising a plurality of rotatable stuffing horns, or casing holders 41, as more clearly shown in FIG. 29 of the drawings. As well known by those skilled in the art, the casing 42, which is preferably a shirred length of artifical casing, is placed over the rotatable casing holder 41, as shown in FIG. 26, to receive the injected meat product or emulsion 39. The rate of injected flow into the casing 42 through the interior 43 of the casing holder 41 is adjustably determined by the driving speed of the drive motor 35. The rotation of the casing holder 41 is effected within a bearing 44 by the rotation of a gear 45, affixed to the horn 41, and meshing with a drive gear 46 secured to the upper end of a horn drive shaft 47. As shown in FIG. 2, the lower end of the horn drive shaft 47 has a drive pulley 48 rotated by a drive cable 49. The drive cable 49 is driven by a drive pulley 50 affixed to the end of a motor shaft 51. A horn-driving motor 52, of the adjustable speed type, is provided, being mounted upon one of the upright support members 4, as shown in FIG. 2, and the driving action thereof effects through the drive cable 49 rotation of the left-hand casing holder, as viewed in FIG. 2. In order to synchronize both rotatable casing holders 41 of both product injecting devices 53, an additional drive pulley 48a is affixed to the left-hand horn drive shaft 47, as viewed in FIG. 2, and an additional drive cable 49a effects rotation of the drive pulley 48 of the right-hand product-injecting device 53.

Figure 4:
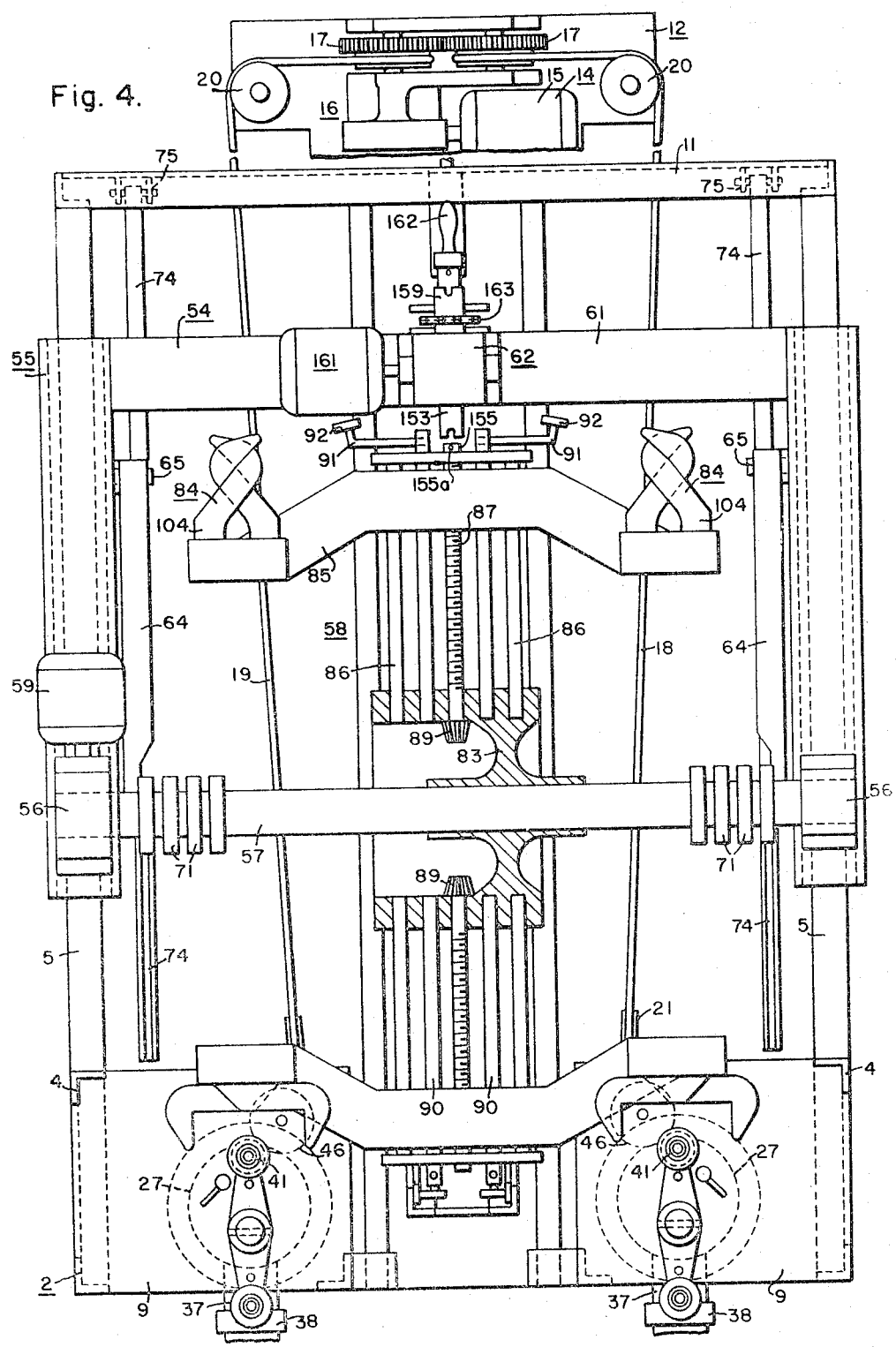
FIG. 4 is a fragmentary top plan view of the improved linking and twisting machine of the present invention, with a horizontal sectional view taken through the linking reel substantially on the line IV—IV of FIG. 1A.

*Linking reel assembly—FIG. 4*

To effect a desired rapid linking and twisting action on the encased meat product, there is preferably provided in my improved machine 1 a reciprocally-slidable and automatically-adjustable reel carriage, generally designated by the reference numeral 54, and including a slidable frame 55 carrying two spaced block bearings 56 in which is journaled the reel shaft 57 of a linking reel assembly, generally designated by the reference numeral 58. The linking reel assembly 58 is more clearly shown in FIGS. 1A, 2 and 4 of the drawings.

An adjustable speed reel-drive motor 59 is preferably provided, being carried upon the reciprocally movable slide frame 55 adjacent the left-hand journal support 56, as viewed in FIG. 4. Suitable means, not shown, are provided to synchronize the driving injecting speed of the injector pistons 28 with the driving speed of the reel drive motor 59, so that the resultant linked product will be uniformly filled with the product emulsion 39.

The slide frame 55 includes a plurality of slide bearing blocks 60 slidable on the stationary bearing slide rails 5. In addition, the reel carriage 54 includes a rear, horizontally-extending support member 61 carrying on the upper side thereof a detachable coupling means 62 for effecting the radial adjustment of the pincher assemblies carried on the rotatable linked reel, as more fully described hereinafter.

The reciprocally-movable slide frame 55 also carries a cam-follower selective device, generally designated by the reference numeral 63, and including a cam selector arm 64, pivotally mounted, as at 65, to one of the longitudinally-extending slide rails 66 of the reel carriage 54.

The cam selector arm 64 has an oscillating drive roller 67 pivotally mounted to the extremity thereof, as at 68, and a laterally jutting cam selector bar 69. Adjustably slidable upon the cam selector bar 69 is a cam follower plate 70 which may be selectively positioned beneath one of several cams 71, each of which has a varying number of cam lobes 72, more clearly shown in FIGS. 22 and 23 of the drawings. The four cams 71, as shown in FIG. 22, provide different combinations of links 73 on either side of the respective conveyor cables 18, 19 as shown more clearly in FIG. 1A of the drawings, and as described more fully hereinafter.

Figure 3:
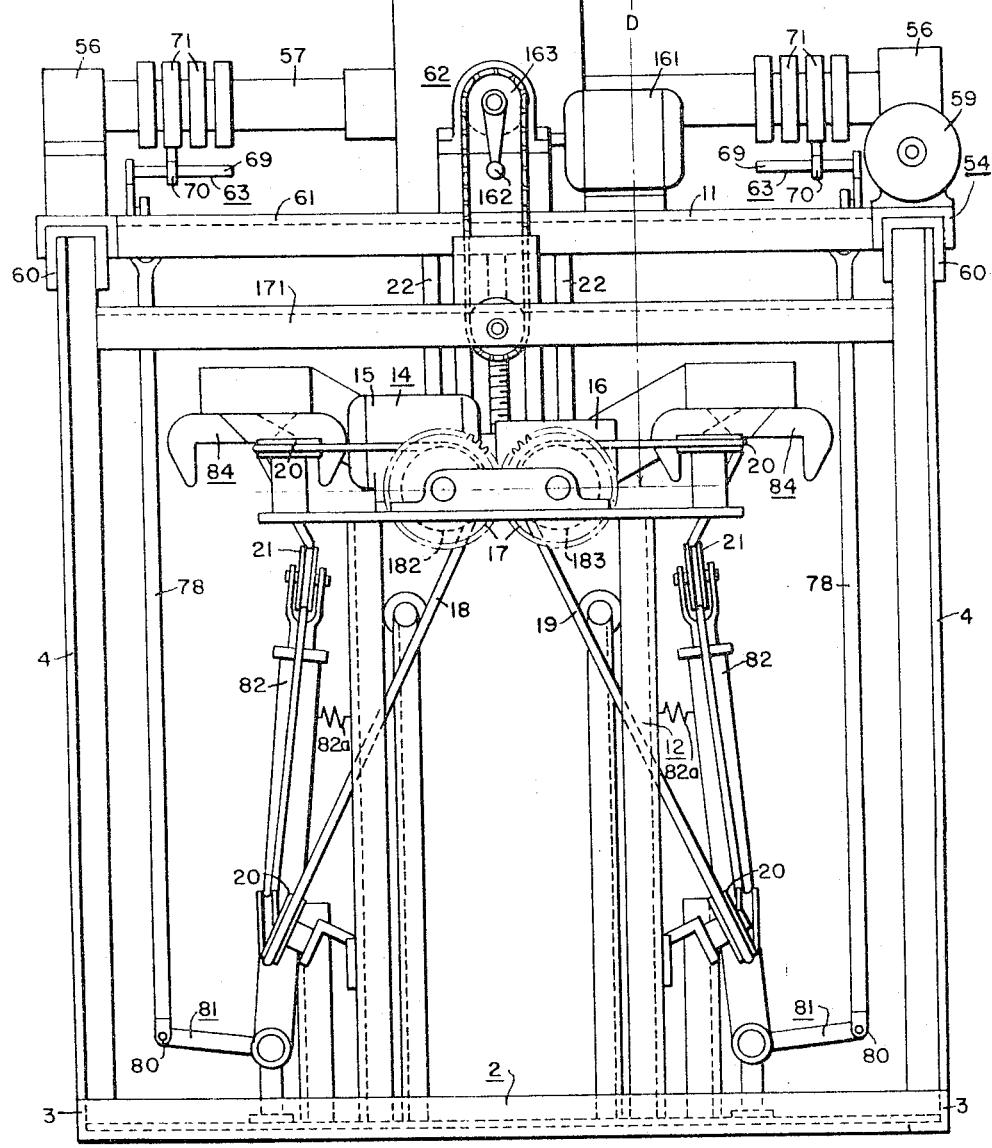
FIG. 3 is a rear elevational view of the outlet end of my improved machine, the view being taken along the line III—III of FIG. 1B.

More particularly, a cam follower arm 74 is pivotally connected, as at 75 (FIG. 4) to the rear brace 11 (FIG. 3), and has a longitudinal slot 77 provided therein, within which rolls the oscillating drive roller 67. As a result, downward intermittent pivotal motion of the grooved lever arm 74, as effected by the cam action of a particular cam 71, will, in turn, effect corresponding downward reciprocating movement of a link 78, pivoted to the extremity thereof, as at 79. The lower end of link 78 is pivotally connected, as at 80, to a conveyor-cable crank-arm, generally designated by the reference numeral 81, and more clearly shown in FIGS. 2 and 3 of the drawings. The crank-arm 81 has an upstanding pulley arm 82 carrying the cable pulley 21 to effect thereby lateral oscillating movement of the conveyor pulley 21 in accordance with the particular cam 71 selected. This will, of course, determine the number of links 73 looped on each side of the conveyor cables 18, 19.

As shown more clearly in FIGS. 1A, 2, 8 and 9, the linking-reel assembly 58 comprises a hub 83 keyed to the reel shaft 57 and rotatable therewith. The reel hub 83 carries a multiplicity of radially adjustable pincher assemblies 84 extending radially therefrom, in the particular example shown 24 in number, and shown more clearly in FIGS. 5, 6, 8 and 9 of the drawings.

With reference to FIGS. 2, 5, 6 and 8 of the drawings the linking-reel assembly 58 slidably carries linking crossheads, or pincher carriers 85 on guide rods 86 extending radially from the hub 83, and the radial position of the pincher support 85 is determined by the degree of rotation of a threaded positioning screw rod 87, threaded through a threaded bore 88 of the pincher holder 85. Each threaded positioning rod 87 has fixedly secured thereto, to cause the rotation thereof, an inner bevel gear 89 which meshes with adjacently disposed bevel gears 89, so that all the pincher carriers 85 will simultaneously be moved radially inwardly or outwardly upon the guide bars 86. Alternate positioning rods 87 have right-hand and left-hand threads so that the different rotations of the rods 87 may be accommodated. An end support plate 76 is disposed at the extremities of rods 86, 87 and 90 and is provided with three bearings 76a for accommodating the rotative movement of rods 87, 90. Pairs of spaced connecting links 76b rigidly space the end plates 76 the proper circumferential distance relative to the reel shaft 57. Also extending radially outwardly from the hub 83 of the linking reel assembly 58 is a pair of cam-actuated pincher-assembly operating rods 90, each having a cam-actuated arm 91 keyed to the outer end thereof to effect timed and predetermined operation of the pincher assemblies 84. The operating rods 90 are, in the particular embodiment shown, of square configuration for a purpose to be described hereinafter. The laterally extending arm 91 has the extremity 91a thereof transversely formed and carries a cam follower roller 92, more clearly shown in FIGS. 18 and 19 of the drawings. Upon rotation of the linking reel 58, the cam follower rollers 92 will be cammed by the cam guide rails 26 (FIG. 7) to effect thereby cammed rotation of the operating rods 90 to the dotted position 93 shown in FIG. 19 of the drawings. This will correspondingly effect rotation of a crank roller 94 keyed to the square operating rod 90, and shown more clearly in FIG. 8 of the drawings. The crank-roller 94 carries a bifurcated crankarm 95 pivotally connected, as at 96, to a floating link 97, the other end of which is pivotally connected, as at 98, to one end of an operating lever 99. The operating lever 99 is pivoted on a stub shaft 100 carried by the pincher carrier 85, as shown in FIG. 8.

Figure 13:
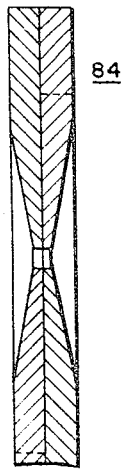
FIG. 13 is a fragmentary sectional view taken, on an enlarged scale, through the engaged pincher arms close to the apices thereof substantially along the line XIII—XIII of FIG. 9.

The other end of the rotatable operating lever 99 is bifurcated, as shown in FIG. 8, and is pivotally connected, as at 101, to a drive link 102 pivotally connected, as at 103, to a clamping or pinching member 104, more clearly shown in FIGS. 11–13 of the drawings. Each pincher assembly 84 comprises two coacting pincher members 104 having gear portions 105 which mesh together, as shown in FIGS. 6 and 9. Stub shafts 106 are provided in a recessed portion 108 of the linking crosshead 85, as shown more clearly in FIG. 6 of the drawings. Bearing apertures 107 are provided in gear portion 105 of each pincher arm 104, as shown in FIGS. 10 and 12 of the drawings. With reference to FIG. 6, it will be noted that following placement of the pincher arms 104 over the stub shafts 106, a covering plate 108a is secured over the recess 108 by the machine screws 108b.

The two coacting pincher members 104 simultaneously move toward each other to effect thereby a pinching or squeezing action upon spaced points along the filled product casing 42 to form the links 73. More particularly, with reference to FIGS. 1A, 2 and 4, it will be observed that the casing 42, stuffed with the product emulsion 39 from the product injecting device 52, is rotated by rotation of the stuffing horn 41 and is then carried by the pinchers 104 rotating with the linking reel assembly 58. During a large portion of the circumferential travel of the linking reel 58, the pincher assemblies 84 are closed, as effected by a tension spring 109, connected between a bracket 110, secured to the pincher carrier 85, and a pin 111 secured to one of the pincher members 104, as shown more clearly in FIG. 5 of the drawings. This action carries the linked casing to the position A in FIG. 1A, at which the linked product is released from the pincher assemblies 84 by the can action exerted by the cam rails 26 upon the cam-follower operating rods 90, and thereupon draped over alternate sides of the conveyor cables 18, 19 as the latter are laterally oscillated by the conveyor-cable oscillating mechanism 112 (FIG. 7).

The cam guide rails 26 are so dimensioned and located relative to the stationary base 2 as to permit closure of the pincher members 104 by the springs 109 at the proper time at position B in FIG. 1A of the drawings. The linked casing 42 is then carried around by the linking reel 58 to the release position A, at which position it is carried away by the conveyor cables 18, 19 to the output end of the machine 1.

The particular configuration of the individual pincher arms 104 and their cooperation with each other constitute very important features of my improved linking and twisting machine 1. With particular reference to FIGS. 10–12 of the drawings, it will be noted that each pincher arm is offset relative to the gear portion 105 thereof so that the shank portions 104a of the pincher arms 104 slide over each other in abutting engagement. Additionally, the end of each pincher arm is provided with a shoulder portion 104b providing a stop for the closed, clamping position of the pincher arm 104, as shown more clearly in FIG. 11 of the drawings. Preferably, the extremity 104c of each pincher arm 104 is beveled, as at 104d, so that additional proper guiding action is obtained during the pinching action on the stuffed casing 42.

This pincher assembly is comprised of two coacting constricting members having off-center edges which compensate the unbalanced constricting action heretofore experienced. All forces are in balance because support is provided on opposite sides of the casing.

The configuration and size of these pinchers are such that in action, the opening presents an ever decreasing square to the product to be constricted. The opening on each pincher is 90° and the center of rotation is far enough from the vertex of the acting edges that through the range of diameters of the most prevalent sausage products this most advantageous circumstance (ever-decreasing square) results.

One further advantage is that the off-center lobe or ear provides "outboard" support for the pincher itself during its action. The counteracting pinchers cannot through wear become separated laterally.

The spring-loaded arrangement maintains proper closure regardless of linkage wear during its lifetime.

Figure 20:
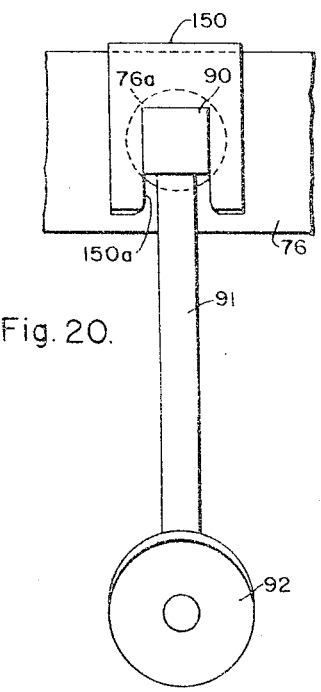
FIG. 20 is a fragmentary detail view illustrating how various pincher arms may readily be selectively locked in the open position to obtain thereby longer lengths of stuffed casing.
Figure 21:
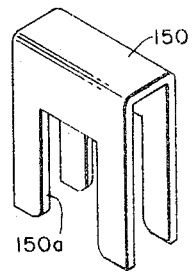
FIG. 21 is a detail perspective view of one of the locking clips employed in the locking operation illustrated in FIG. 20.

For certain applications where it is desired to obtain links of considerable length, and where the radial outer position of the pincher assemblies 84 on the linking reel assembly 58 is not sufficient to effect such a desired longer length of product link, one may lock out alternate pincher assemblies 84 by manually rotating the operating rods 90, as shown in FIG. 20 of the drawings. In other words, comparing FIGS. 19 and 20 of the drawings, the pincher arms 91 may be rotated substantially 90° relative to their operative positions, as shown by the full lines of FIG. 19, and assume the dotted line positions 93. The arms 91 may then be locked out of operation in this position, as shown in FIG. 20 by the manual placing of a locking clip 150 over the end plate 76. It will be noted that the locking clip 150 (FIG. 21) has a rectangularly-shaped bifurcated portion 150a which may be placed into engagement with the rectangularly-shaped operating rods 90 as shown in FIG. 20 and thereby prevents their rotative, operative movement. This will selectively lock out alternate pincher assemblies 84 so that the pincher members 104 will be locked in their diverged open position. For still longer product links, two out of three of the pincher assemblies 84 may be locked out, so that out of the total of 24 pincher assemblies on the linking reel 58 only eight spaced pincher assemblies will be operatively effective to pinch the product casing 42 at the desired time. In addition to the selective locking feature of my improved linking machine 1, it must be remembered that the selected operating pincher assemblies 84 may be radially adjusted upon the threaded positioning rods 87 so that, in effect, an infinite variety of lengths of product links may thereby be obtained.

From the foregoing, it will be apparent, for example, that sizes three-inch lengths to six-inch lengths are obtainable through the expansion of the pincher assembly position from an innermost position (FIG. 2) at which the diameter "d" is two feet, to an outermost position (FIG. 3), in which the diameter "D" is four feet. Larger sizes are available by locking out pincher assemblies. For example, setting the wheel on a four and one-half inch (4½") size and locking open every other pincher assembly would produce a nine inch (9") link. Setting the wheel on a six inch (6") size and locking open two (2) of every three (3) assemblies produces an eighteen inch (18″) link. The adjustments provide for the proper stuffing.

Figure 14:
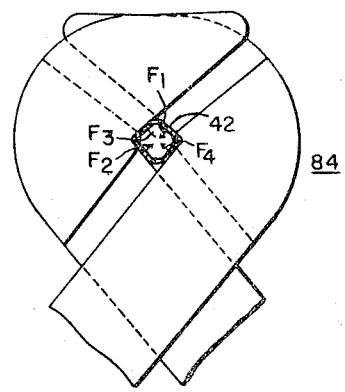
FIG. 14 is a fragmentary plan view of a pair of coacting pincher arms in the partially closed constricting position thereof as acting upon a product casing.

Casing constricting action—FIG. 14

A disadvantage of the prior art linking machines was that the constricting action provided by the closing movement of the notched pincher arms produced an undesirable shearing action upon the product casing. FIG. 15 of the drawings illustrates this undesirable shearing action upon the interposed product casing 42, which many times caused actual tearing and rupturing of the casing resulting in destroyed links 73.

As hereinbefore mentioned, a distinct and very important advantage of my invention is an equalization of the constricting forces exerted upon the product casing 42 as the interlocked pincher arms 104 act to constrict the product casing 42 at the constricting points 42a thereof.

The constricting force $F_1$ (FIG. 12) exerted by the edge 104e of the laterally-disposed gathering segment 104c is diametrically opposed and substantially equal to the constricting force $F_2$ (FIG. 10) exerted by the edge 104s of the shank portion 104a of the cooperating interlocked pincher arm 104.

Similarly, the constricting force $F_3$ (FIG. 10) exerted by the edge 104e of the laterally-disposed gathering segment 104c is diametrically opposed and substantially equal to the constricting force $F_4$ (FIG. 12) exerted by the edge 104s of the shank portion 104a of the other cooperating interlocked pincher arm 104. As a result of the foregoing, all of the constricting forces $F_1$, $F_2$, $F_3$ and $F_4$ are diametrically opposed and counterbalanced. FIGS. 14, 16 and 17 illustrate this desirable balanced constricting action in detail. Such balanced forces effectuates less product-casing damage and considerably reduces pincher-arm wear, thereby resulting in substantially greater constricting-arm life.

The shank portion 104a of each pincher 104 is preferably coplanar with the extremity, or laterally disposed gathering segment 104c, of the cooperating interlocked pincher arm, clearly shown in FIG. 17.

The two constricting edges 104e and 104s are disposed at substantially right angles and coact in such a manner, that a substantially ever-decreasing square configuration is effected by the two pinchers 104 through their working arc more clearly illustrated in FIG. 14. The working arc is such that all linked products of commonly-used diameters (16 mm. to 55 mm., for example) can be constricted without any adjustment to the pincher-arm assembly. I have discovered from further investigation that a fulcrum point 106 located approximately 6 inches away from the vertex 120 (FIGS. 6 and 9) of the pinching action of the pinching arms is desirable, although not absolutely necessary, to effect the most efficient constriction of the product casing 42 and render the pinching arm 104 susceptible to economical manufacture.

Pincher-assembly adjusting device—FIG. 25

A pincher-assembly adjusting device 152 is provided including, a detachable coupling means 62, for effecting the radial adjustment of the pincher assemblies 84 carried on the rotatable linking reel 58. In addition, it is desired to effect an automatic proper positioning of the pincher-arm location relative to the casing holder 41 as a function of the radial position of the pincher assemblies 84 on the linking reel 58. To effect this end, the detachable coupling means 62 comprises a coupling sleeve 153 having a detachable coupling 154 for locking the end 155 (FIG. 4) of a positioning rod 87 with the sleeve 153. Such a coupling 154 may assume the form of transverse coupling pin 155a, secured to the extremity of the positioning rod 87, and a pair of diametrically-opposed coupling recesses 156 formed in the extremity of the coupling sleeve 153.

Disposed adjacent the other end of the coupling sleeve 153 is a transverse coupling pin 157, which makes detachable coupling engagement with coupling recesses 158 formed on the end of a drive sleeve 159 extending through a gear reduction box 160 and driven, at certain desired times, by a drive motor 161.

The coupling sleeve 153 has a handle 162 adaptable for manually rotating the coupling sleeve 153 into simultaneous coupling engagement with both the positioning rod 87 and the drive sleeve 159.

The drive sleeve 159, in addition, has a sprocket wheel 163 fixedly secured thereto, as by a force fit; and a sprocket chain 164 is effective to translate rotation of the drive sleeve 159 into rotation of a sprocket wheel 165 journaled in bearings 166 provided in a depending bracket 167 supported from the support member 61.

The sprocket wheel 165 has a threaded linking-reel positioning rod 168 fixedly secured thereto and rotatable therewith. The threaded linking-reel positioning rod 168 threads through a nonrotatable square nut 168a enclosed within a box-shaped housing 169, and biased by a compression spring 170 to a predetermined end position, as shown in FIG. 25. As shown more clearly in FIGS. 1B and 25, the box-shaped housing 169 is supported from a cross-brace 171 of the stationary base 2 and thereby with the nut 168a in its end position, as shown in FIG. 25, determines the position of the reel carriage 54 relative to the base 2 as a function of the number of turns traversed by the threaded linking-reel positioning rod 168. As a result, the radial position of the pincher assemblies 84 on the reel 58 determines the position of the reel carriage 54 relative to the base 2, and thereby automatically accurately located the pincher arms 104 relative to the horn 41 for proper constricting action upon the casing 42.

By way of recapitulation, when the operator desires to change the length of the product links 73 he grasps the handle 162 and manually engages the coupling sleeve 153 with both the positioning rod 87 and the drive sleeve 159. Then the operator starts the drive motor 161 which then drives the drive sleeve 159. The rotation of the drive sleeve 159 will not only effect rotation of the positioning rod 87 through the coupling sleeve 153, but also the drive sleeve 159 will rotate the sprocket wheels 163, 165, and automatically turn the positioning rod 168 to change the position of the reel carriage 54 relative to the base 2. Thus, for a greater length of link 73, the pincher assemblies 84 will be positioned radially outwardly on the rods 86 of the linking reel 58 a greater extent; and simultaneously, the positioning rod 168 will be rotated to screw into the nonrotating square nut 168a, and move the entire reel carriage 54 toward the right, as viewed in FIGS. 1A and 1B. This will again locate the pincher arms 104 directly above the stuffing horn 41 for the proper reception of the stuffed casing 42.

When the drive motor 161 has driven the pincher arms 104 to the desired extent radially upon the linking reel 58 for the desired new length of link, then the operator will at this time stop the drive motor 161, and then manually disengage the coupling sleeve 153 from the positioning rod 87 and the drive sleeve 159. The coupling device 62 will then be inactive until a new length of link 73 is desired.

The net effect of the pincher-assembly adjusting device 152 is, therefore, an automatic proper positioning of the pincher-arm location relative to the casing holder 41 as a function of the radial position of the pincher assemblies 84 upon the linking reel 58.

Conveyor-cable driving mechanism—FIG. 7

The conveyor cables 18, 19, which carry the linked product 73, woven to opposite sides thereof, as effected by the oscillating device 63, are driven by a drive motor 15 through a gear-reduction unit 16, as shown more clearly in FIGS. 1B and 7 of the drawings. More specifically, the rear base extension 12 supports, through the upright support members 13, a cable-driving platform 177. Disposed upon the platform 177 is a pair of guide pulleys 20 and a pair of meshed drive gears 17 carrying driving wheels 182, 183. As shown, one drive gear 17 is driven from the gear-reduction unit 16 for the attainment of the cable movement.

As shown more clearly in FIG. 1B, smoke sticks 185 may be supported from forked standards 186 to each side of the outlet end of the machine 1, so that a length of linked product may be removed from the conveyor cables 18, 19 and placed upon a smoke cart, not shown, for further processing. As well known by those skilled in the art, a length of artificial casing may be any standard length, such as 55 feet or 84 feet. Each smoke stick 185 is located below the conveyor cables 18, 19, so that the operator may lift up on the smoke stick 185 to remove a length of linked product 73 from the conveyor cables 18, 19.

Figure 24:
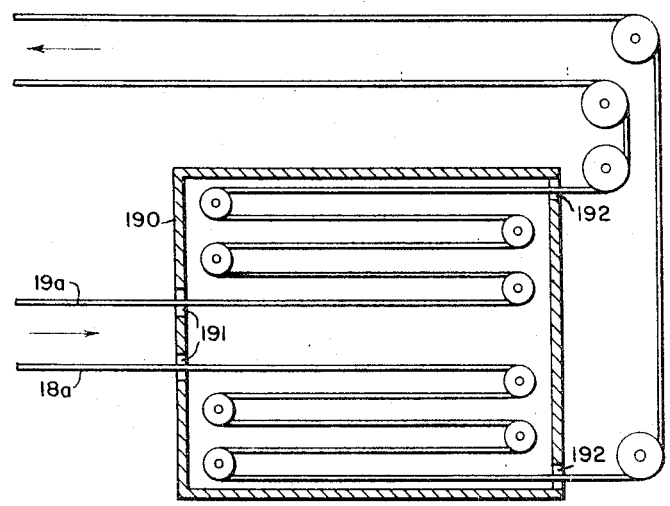
FIG. 24 is a fragmentary diagrammatic view of a conditioning chamber, through which the conveyor cable may carry the linked product as produced by my invention.

For certain applications, it may be desirable to provide a continuous automatic conveyorized method of stuffing, smoking, cooking and further processing frankfurters and bologna products; and FIG. 24 is intended to illustrate such a modification of the invention. As shown in FIG. 24, the conveyor cables 18a, 19a may be guided upon suitably provided pulley guide rods (not shown) into a smoke house or conditioning chamber 190 through the inlet end 191 thereof. After passing at a desired predetermined speed through the smoke house 190, the conveyor cables 18a, 19a may leave the outlet end 192 of the smoke house, and return to the inlet, or stuffing end of the linking machine 1 for further product carriage.

*Variable casing-holder retardation device—FIGS. 26–28*

For proper stuffing action, some restraining pressure exerted upon the casing 42 is required to stuff the links 73 with meat at the proper pressure. Presently, according to prior-art practice, this has been done externally by hand. Since skills of the operator may vary, the pressure exerted by the operator on the casing 42 varies, and nonuniformity of the resultant linked product 73 will occur. As will be obvious, it is difficult for the operator to properly control the amount of resistance exerted upon the product casing, since there is no solid stop, or bearing surface encountered when friction is manually applied to the outside of the casing 42 according to prior-art practice.

I have surmounted this difficult problem in the art in my improved linking machine 1 by providing a predetermined, preset internal frictional retarding force exerted internally upon the casing 42 by the particular construction of the casing holder 41, as more fully described hereinafter. Since artificial casing is uniform in diameter, the restraining frictional force, when applied internally, can be adjusted to a constant force, thereby effecting a constant internal pressure, which results in the production of an evenly-stuffed length of product 73. The use of an internal spring arrangement, as more fully described hereinafter, is very advantageous in supplying the driving force in rotating the casing, as it is stuffed from the horn 41.

More particularly, with reference to FIG. 26 of the drawings, it will be noted that a modified-type casing holder, or stuffing horn 41a is illustrated, having a plurality of circumferentially-disposed internal friction fingers 250. These internal friction fingers 250 may be formed by slotting and properly configuring a tubular metallic member in the fabrication of the casing holder 41a. The resilient frictional fingers 250 will exert a predetermined internal frictional drag upon the casing 42, as the latter is withdrawn from the holder 41a during the linking operation. For a different size casing 42, or for a different value frictional drag, a different casing holder 41a would be employed.

FIGS. 27 and 28 illustrate a modified-type of casing holder, or stuffing horn 41b having incorporated therewith adjustable means for increasing the internal friction exerted by guide fingers 252 upon the casing 42, as the latter is withdrawn from the casing holder and stuffed with the meat emulsion 39. An adjustable retardation effect exerted upon the ejected casing 42 is provided by an adjustable friction ring 254, threaded upon a removable nozzle 256, which is slid over the tubular stuffing horn 41b, and retained thereon by a bayonet-type releasable latch 264. Said latch 264 includes a plurality of latching pins 265, in this particular instance four in number, and slid into longitudinally-extending slots 266 provided in the tubular horn 41b.

A spanner wrench, not shown, may be manually applied to adjustment recesses 254a to effect thereby variable frictional drag by camming action of circumferential surface 254b of friction ring 254 upon shank portions 252a of friction and guide fingers 252.

As more clearly shown in FIG. 28, in the particular embodiment shown, there are provided eight leaf springs 252. These may be fabricated by suitably slotting and configuring a tubular base member 260. The tubular base member 260 may be affixed, as by welding, to the lower portion 256a of the removable nozzle 256. The lower extremity 256a of the removable feed nozzle 256 may be beveled, as at 256b to accommodate the extraction of the casing 42 thereover.

The resilient spring fingers 252 frictionally bear upon the inside of the product casing 42, and cause the stuffing of the product emulsion 39 to be tight or loose, depending upon the requirements, and also provide the rotational driving force to rotate the casing 42 to form the twists at the constricting points 42a.

During a loading operation at a loading station "L," the operator first removes the nozzle 256 from the tubular stuffing horn 41, and then places a length of shirred casing 42 over the horn 41. The nozzle is then replaced over the horn 41 with the latching pins 265 inserted in latching slots 266, with a final rotational locking movement to lock the bayonet-type latch 264. The upper end of the casing 42 is then manually drawn over the spring fingers 252 allowing a length of casing 42 to protrude, as is well known to those skilled in the art.

Figure 30:
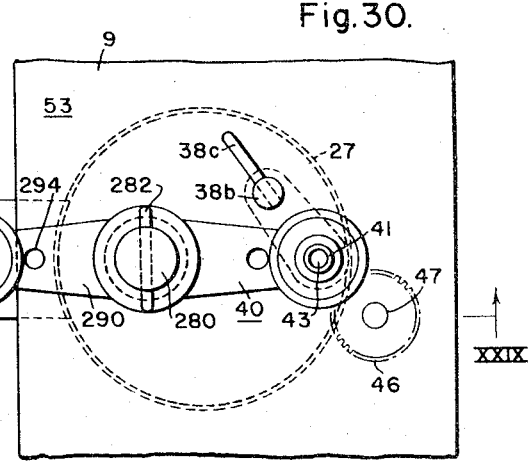
FIG. 30 is a fragmentary plan view of the multiple-unit turret assembly of FIG. 29; and, FIG. 31 is a diagrammatic view of the electrical control for properly cycling the several motors, or drive means, of the linking machine of my invention.

*Rotatable turret-head assembly—FIGS. 29–30*

With a view to speeding up the loading operation of the shirred casing upon the casing holder 41, preferably there is provided upon the support plate 9 the turret assembly 40, which may include a number of circumferentially-disposed rotatable casing holders 41. In the particular embodiment of the invention illustrated in FIGS. 29 and 30, there are only shown two such rotatable casing holders 41, but obviously there may be more provided.

The head plate 9 includes a turret shaft 280 affixed thereto having a key slot 281 transversely extending therethrough, which accommodates a key 282. A compression spring 284 is interposed between the head plate 9 and the turret head 290, and functions to facilitate rotation of the turret assembly 40, upon removal of the key 282, to change the position of a particular loaded horn 41 from the loading station "L" to the injection station "J." In other words, the rotatable turret head 290 carries a plurality of rotatable stuffing horns 41 thereon, and suitable means are provided to position one stuffing horn 41 at an injection station "J," while at least one other stuffing horn 41 is positioned at a loading station "L." At the loading station "L," the operator may position a shirred product casing 42 over the one stuffing horn 41 during the time the other stuffing horn 41 is feeding product 39 into its respective casing 42.

Positioning pins 294 are affixed to the head plate 9 and register with positioning apertures 296 in the rotatable turret head 290 during the correct station position, so that the driven gear 45, secured to each horn 41, will properly mesh with the drive gear 46 driven from horn motor 52.

Figure 31:
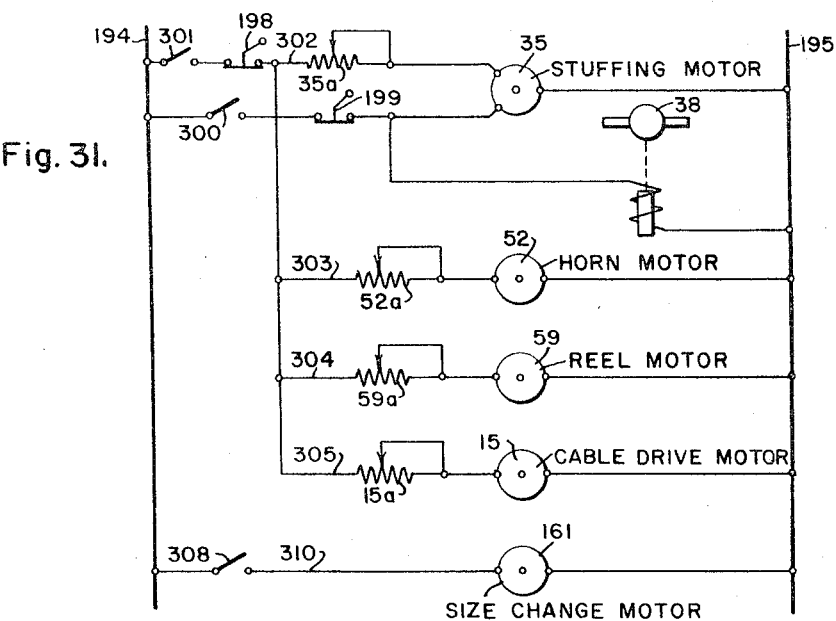

*Driving means and operating sequence—FIG. 31*

FIG. 31 diagrammatically illustrates the various drive motors, which collectively constitute the driving means of my improved invention. However, it is to be clearly understood that suitable hydraulic driving means could be utilized instead of electrical drive means, if desired.

More particularly, in the operation of my improved linking machine, the operator first grasps the handle 38c and closes gate valve 38a. Then he closes switch 300 (FIG. 31) which simultaneously energizes stuffing motor 35 from a suitable electrical supply source 194, 195 to rotate said motor in the intake direction, and also energize the electrically-actuated intake valve 38 to permit entry of the produce emulsion 39 under pressure from a suitable pressure source, not shown, through aperture 36 (FIG. 2).

During this filling time, the operator manually retracts the reel 58 which compresses the spring 170 (FIG. 25), to thereby provide clearance about the casing holder 41 in order to rotate the turret assembly 40, when used. When the turret assembly 40 is not used, and only a single casing holder 41 is employed, the aforesaid clearance may be utilized to advantage to facilitate the positioning of the shirred casing 42 over such a single casing holder.

Suitable means, such as a limit switch 199 may be utilized to de-energize the stuffing motor 35 and the inlet valve 38 at a predetermined point in the intake stroke of the product-driving piston 28.

Now the operator manually opens the gate valve 38a by manipulation of the operating handle 38c and energizes switch 301. The energization of switch 301 simultaneously energizes through circuits 302, 303, 304 and 305 the respective stuffing motor 35 in the stuffing rotational direction, the horn motor 52 to spin the casing holders 41, the reel motor 59 to rotate linking-reel assembly 58, and the cable-drive motor 15 to effect conveying motion of the product-collecting cables 18, 19.

When the product-driving piston 28 reaches a predetermined position toward the end of its product-driving direction, a limit switch 198 (FIG. 31) for example, may be utilized to effect de-energization of the several drive motors 35, 52, 59 and 15. This limiting position is reached substantially at the same time as the end of the shirred casing 42 is withdrawn from the casing holder, or horn 41. It has been calculated, for example, that such linking period might approximate 20 seconds, or thereabouts, when a 55-foot casing is used. For an 84-foot standard casing length, a proportionally longer linking period, such as 30 seconds, for example, is necessary, as is obvious to those skilled in the art. During the aforesaid linking period, the operator may first position two additional shirred casings upon the loading horns 41 of the turret assemblies 40, when used, and also lift the two smoke sticks 185, carrying the product links 73, and position them on a nearby smoke tree for further conditioning. In the case of a continuous conveyor system, such as previously described in connection with FIG. 24, such action is obviously not necessary. Upon actuation of the limit switch 198 the linking cycle is completed, and the entire operating cycle, as described, is then repeated for further linking operations.

With further reference to FIG. 31, the size-changer motor 161 may be energized by closing switch 308 to thereby effect radial repositioning of the pincher assemblies 84 relative to the reel hub 83 to change the lengths of the product links 73. The size-changer circuit 310 is isolated relative to the previously-described motor-energizing circuits 302, 303, 304 and 305, and may only occasionally be utilized.

As will be obvious, the relative speeds of drive motors 35, 52, 59 and 15 must be properly synchronized relative to each other to properly accomplish their respective functions in the required time. To effect this end, suitable speed-changing means, such as variable resistance means 35a, 52a, 59a and 15a, may be utilized to effect such synchronization. Such variable resistance means may be manually corrected.

Any change in product length 73 effects an attendant change in the speed ratio of the several drive motors, as will be obvious to those skilled in the art. It will also be obvious to those skilled in the art that in substitution of the aforesaid manual actuation of the switches 300, 301 and the automatic tripping of the limit switches 198, 199, suitable automatic control devices, punch-card operated, or tape-controlled, may be used to further automate the linking process.

From the foregoing description it will be apparent that I have provided an improved product-linking machine of high-speed and effective operation, which, among other novel features, has the following important advantages and characteristics:

(1) High - speed continuously - movable linking - reel action.

(2) Infinitely-variable lengths of product links 73.

(3) Oscillatable movement of the conveyor-cable guide means for accommodating different hanging patterns of the links 73.

(4) Adaptability of the linking machine to accept different types of meat grinds and emulsions.

(5) Means for varying the linking-reel position with respect to the stationary feed horn 41 as a function of the radial position of the pincher assemblies 84 upon the linking reel 58.

(6) Providing a movable reel carriage 58 for facilitated loading operations.

(7) Improved constricting action exerted upon the product casing for reducing casing damage, and for increasing the percentage of saleable product.

(8) Improved frictional retardation device exerted upon the product casing for regulating the uniformity of the suffing pressure within the casing.

(9) Improved interlocking pincher action to reduce bearing wear and, consequently, lengthen machine life.

(10) Improved simultaneous pincher positioning resulting from adjustment of a single positioning rod 87.

(11) Variable length product resulting from locking out alternate pincher assemblies, or combinations thereof.

(12) Improved cam-selector linkage for varying the product pattern upon the conveyor cables 18, 19.

(13) Improved turret arrangement whereby the horns carried thereby are rotatable.

(14) Universal adaptation of the linking reel 58 for all commercially-available product casing diameters without adjustment.

(15) An improved linking machine not requiring expendable strings or fasteners.

(16) Pincher-assembly operation is independent of radial position of the pincher assembly upon the linking reel.

(17) An improved linking machine adaptable for incorporation into existing improved progressive conditioning systems.

(18) An improved universal linking machine adaptable for operation by punch-card operated, or tape-controlled automatic control devices.

(19) A linking machine providing stuffing and linking operations which are independent of the variations encountered by using human operators.

(20) A linking reel having a double row of pinching assemblies attached to the same rotatable reel, to double the output without doubling the cost.

(21) A linking machine so designed that a minimum of setup time is required to change from one product to another.

(22) An improved linking machine wherein the casing is rotated vertically to eliminate the gravitational effect upon long links 73.

(23) A linking machine effecting direct control of volumetric displacement of the product with respect to the constant length of artificial casing used.

(24) An improved linking machine involving a new method of linking a linked product.

(25) An improved linking machine of relatively open construction adapted to modern rapid cleansing operations.

(26) An improved linking machine requiring less maintenance (which is of a simplified type), and capable of long service life.

The term fluid-like product as used herein, and in the appended claims, is intended to comprise sausage emulsions, sausage grinds, wiener emulsions, pork-sausage products, hot-sausage products, and, in general, all grinds commonly found in sausage kitchens, and intended to be incased in stuffed products.

Although there has been illustrated and described specific embodiments of the present invention, it is to be clearly understood that the same were merely for the purpose of illustration, and that changes and modifications may readily be made therein by those skilled in the art, without departing from the spirit and scope of the invention.

I claim as my invention:

1. The method of forming a stuffed product as a series of integrally-connected links comprising the steps of: rotating a vertically disposed casing about a generally vertical axis, injecting a fluid-like product into the vertically-rotating casing, transporting the stuffed casing in an arcuate path, constricting spaced portions of the rotating stuffed casing at the origin of entry of said arcuate path of travel to effect thereby a twisting action upon the stuffed casing at the points of constriction to thereby produce the links.

2. The method of forming linked sausages, and the like, comprising the steps of: rotating a product casing about a generally vertical axis, injecting the sausage emulsion under pressure upwardly in a vertical direction into the vertically-positioned rotating product casing, carrying the filled product casing from an upward vertical position into an annular path of travel, constricting spaced portions of the rotating stuffed casing at the origin of entry of said circular path of travel, increasing the pressure of constriction at said spaced portions during a portion of the circular path of travel, and finally releasing the constricting pressure to free the integrally-connected twisted links.

3. The method of forming a stuffed product as a series of integrally-connected links comprising the steps of: rotating a vertically disposed casing about a generally vertical axis, injecting a fluid-like product into the vertically-rotating casing, transporting the stuffed casing in an arcuate path, and simultaneously constricting spaced portions of the rotating stuffed casing at the origin of entry of said arcuate path to effect thereby a twisting action upon the stuffed casing at the points of constriction to thereby produce the links.

4. The method of forming a stuffed product as a series of integrally-connected links comprising the steps of: injecting a fluid-like product into a generally vertically-positioned rotating casing, constricting spaced portions of the rotating stuffed casing by means of a plurality of spaced pincher assemblies, and subsequently releasing the pincher assemblies in succession from the twisted links.

5. The method of forming a stuffed product as a series of integrally-connected links comprising the steps of: injecting a fluid-like product into a generally vertically-positioned rotating casing, transporting the stuffed casing in an arcuate path by means of a plurality of spaced pincher assemblies, and successively constricting spaced portions of the rotating stuffed casing during the arcuate path of travel by said spaced pincher assemblies, and subsequently releasing the pincher assemblies in succession from the twisted links to thereby produce the links.

6. The method of claim 1, wherein the fluid-like product is injected in a generally upward vertical direction.

7. The method of forming a stuffed product as a series of integrally-connected links comprising the steps of: rotating a product casing about a generally vertical axis, injecting a fluid-like product into said rotating casing, transporting and constricting spaced portions of the rotating stuffed casing by means of a plurality of spaced pincher assemblies, and finally releasing the pincher assemblies in succession to thereby produce the links.

8. The method of claim 7, wherein the casing is conveyed in a generally vertical direction by the spaced pincher assemblies.

9. The method of claim 8, wherin the direction is generally vertically upwardly.

10. The method of claim 4, wherein the additional step is provided of equalizing the constricting forces exerted upon the product casing to thereby prevent undesirable shearing action exerted upon the product casing.

11. The method of claim 7, wherein the additional step is provided of equalizing the constricting forces exerted upon the product casing to thereby prevent undesirable shearing action exerted upon the product casing.

12. The method of forming a stuffed product as a series of integrally-connected links comprising the steps of: rotating a product casing in a generally vertical direction, injecting a fluid-like product into the generally vertically-rotating product casing, transporting the filled product casing generally vertically, and finally constricting spaced portions of the rotating stuffed product casing to effect thereby a twisting action upon the stuffed product casing at the points of constriction to thereby produce the links.

13. The method of claim 12, wherein the injection and the transporting are made in a generally upward direction.

References Cited by the Examiner

UNITED STATES PATENTS

| 1,366,183 | 1/1921 | Hottmann | 17—33 |
| 2,663,982 | 12/1953 | Conti | 17—34 X |

FOREIGN PATENTS 1,184,558  2/1959  France.

SAMUEL KOREN, *Primary Examiner.*

LUCIE H. LAUDENSLAGER, *Examiner.*